United States Patent [19]

Akiyama

[11] Patent Number: 6,106,943
[45] Date of Patent: Aug. 22, 2000

[54] CORD FOR REINFORCING A RUBBER AND TREATING MATERIAL THEREOF

[75] Inventor: Mitsuharu Akiyama, Tsu, Japan

[73] Assignee: Nippon Sheet Glass Co., Ltd., Osaka, Japan

[21] Appl. No.: 09/251,398

[22] Filed: Feb. 17, 1999

[30] Foreign Application Priority Data

Feb. 24, 1998 [JP] Japan .................................. 10-041841
Feb. 24, 1998 [JP] Japan .................................. 10-042047
Feb. 24, 1998 [JP] Japan .................................. 10-042570

[51] Int. Cl.⁷ .............................. D02G 3/00; D02G 3/48
[52] U.S. Cl. ....................... 428/375; 428/383; 428/390; 428/391; 152/451
[58] Field of Search ........................... 152/451; 428/375, 428/379, 383, 391, 390

[56] References Cited

U.S. PATENT DOCUMENTS

| | | | |
|---|---|---|---|
| 4,818,601 | 4/1989 | Itoh et al. . | |
| 4,935,297 | 6/1990 | Yotsumoto . | |
| 4,978,409 | 12/1990 | Fujiwara et al. ........................ | 156/315 |
| 5,219,902 | 6/1993 | Mishima et al. ........................ | 523/206 |
| 5,310,386 | 5/1994 | Mizuno et al. ........................ | 474/205 |
| 5,484,848 | 1/1996 | Jadamus et al. . | |

FOREIGN PATENT DOCUMENTS

| | | |
|---|---|---|
| 53-096049 | 8/1978 | Japan . |
| 63-243380 | 10/1988 | Japan . |
| 63-312333 | 12/1988 | Japan . |
| 7-330957 | 12/1995 | Japan . |
| 254 071 | of 0000 | U.S.S.R. . |

*Primary Examiner*—William Krynski
*Assistant Examiner*—J. M. Gray
*Attorney, Agent, or Firm*—Sughrue, Mion, Zinn, Macpeak & Seas, PLLC

[57] ABSTRACT

A reinforcing cord which strongly adheres to a mixed rubber comprising a hydrogenated acrylonitrile-butadiene rubber having excellent flex resistance and heat resistance and a hydrogenated acrylonitrile-butadiene rubber having dispersed therein zinc methacrylate, and a treating material for forming a coating layer on the cord. The reinforcing cord comprises a fiber for reinforcing a rubber, a first coating layer formed on the surface of the fiber, obtained by coating a treating material comprising a resorcin/formalin condensate and a rubber latex on the surface thereof, and a second coating layer formed on the first coating layer, obtained by coating another treating material comprising a rubber compound, a vulcanizing agent and one member selected from the group consisting of a silane coupling agent, a maleimide type vulcanization assistant and a dimethacrylate type vulcanization assistant.

10 Claims, No Drawings

CORD FOR REINFORCING A RUBBER AND TREATING MATERIAL THEREOF

FIELD OF THE INVENTION

The present invention relates to a cord for reinforcing a rubber, which is used for reinforcing a mixed rubber of a hydrogenated acrylonitrile-butadiene rubber (hereinafter referred to as "H-NBR") having excellent flex resistance and heat resistance and a hydrogenated acrylonitrile-butadiene rubber having zinc methacrylate dispersed therein (hereinafter referred to as "H-NBR/ZDMA").

BACKGROUND OF THE INVENTION

In general, it is widely conducted to embed glass fibers, chemical fibers or the like as reinforcing fibers in a rubber in order to improve strength and durability of rubber products such as rubber belts or rubber tires.

However, the reinforcing fibers themselves have poor compatibility with rubbers, resulting in poor adhesive property with rubbers. Therefore, if the reinforcing fibers are embedded in rubbers without treating the surface of the reinforcing fibers, the reinforcing fibers and the rubbers are not adhered or adhesive force therebetween is weak, so that they easily separate each other during use. Under such a state, the reinforcing fibers cannot satisfy performances required as a reinforcing material of rubber products.

For the above reason, where various reinforcing fibers are used in rubber products, it is generally and widely conducted to form on the surface of the reinforcing fibers a coating layer which improves a compatibility with a rubber used and therefore increases adhesive property therewith.

For example, JP-A-63-270877 (the term "JP-A" used herein means an "unexamined and published Japanese patent application") discloses a glass fiber cord having a coating which is formed by coating a mixed treating material of a resorcin/formalin condensate and H-NBR latex on glass fibers, and drying and curing the same. Further, JP-B-5-71710 (the term "JP-B" used herein means an "examined and published Japanese patent publication") proposes a fiber for reinforcing a rubber, further having a second layer formed by coating a halogen-containing polymer and an isocyanate on the above-described coating layer of the mixed treating material, and a third layer containing the same rubber as a matrix rubber formed on the second layer. However, the former cannot obtain a sufficient adhesive strength with a mixed rubber of N-NBR and H-NBR/ZDMA, and the latter requires coating a third layer, so that production steps are complicated and production cost increases.

As described above, it is generally and widely conducted to form a coating layer on the surface of reinforcing fibers in order to improve adhesive property between rubbers used and the reinforcing fibers. However, there are a variety in kinds of rubbers and reinforcing fibers recently used, and if the kinds of rubbers and reinforcing fibers used vary, the kind of the coating layer for improving adhesive property with those naturally varies.

In recent years, H-NBR/ZDMA rubbers are noted in various fields. A rubber obtained by mixing H-NBR/ZDMA rubber with H-NBR rubber has high heat resistance as compared with H-NBR rubber conventionally used. Therefore, such a mixed rubber can be used in the field in which the conventional rubbers could not been used, or can be used as a high performance-substitute for conventional rubbers.

SUMMARY OF THE INVENTION

As a result of extensive investigations to overcome the above-described problems in the prior art, it has been found that adhesive property between a rubber comprising H-NBR and H-NBR/ZDMA and a reinforcing cord can markedly be improved by using a treating material for a coating layer, comprising a rubber compound, a vulcanizing agent and one member selected from the group consisting of a silane-coupling agent, a maleimide type vulcanization assistant and a dimethacrylate type vulcanization assistant, as an outermost layer of a reinforcing cord, that is, a second coating layering the present invention.

Accordingly, one object of the present invention is to provide a reinforcing cord having an increased adhesive property with rubbers, in using reinforcing fibers in rubbers comprising H-NBR and H-NBR/ZDMA.

Another object of the present invention is to provide a treating material for forming a coating layer (a surface treating film as a second layer on reinforcing fibers) for the reinforcing cord.

In order to achieve the above objects, the present invention has the following embodiments.

According to one embodiment of the present invention, there is provided a cord for reinforcing a rubber, which comprises:

a fiber for reinforcing a rubber, a first coating layer formed on the surface of the fiber by coating a treating material comprising a resorcin/formalin condensate and a rubber latex on the surface thereof, and drying and curing the resulting coating, and a second coating layer formed on the surface of the first coating layer by coating another treating material on the surface thereof, and drying and curing the resulting coating, wherein the another treating material for forming the second coating layer comprises a rubber compound, a vulcanizing agent and one member selected from the group consisting of a silane coupling agent, a maleimide type vulcanization assistant and a dimethacrylate type vulcanization assistant.

According to a second embodiment of the present invention, there is provided a treating material for forming a second coating layer, which comprises a rubber compound, a vulcanizing agent and one member selected from the group consisting of a silane coupling agent, a maleimide type vulcanization assistant and a dimethacrylate type vulcanization assistant.

DETAILED DESCRIPTION OF THE INVENTION

The present invention is described in detail below.

The fiber for reinforcing a rubber used in the present invention is not limited. Examples of the fiber include glass fibers, polyvinyl alcohol fibers such as vinyl on fibers; polyester fibers; polyamide fibers such as nylon or aramide (aromatic polyamides); carbon fibers; and polyparaphenylene benzoxasol fibers. Of those, glass fibers and aramide fibers are preferably used. The kind of glass fibers is not particularly limited, and examples thereof include non-alkali glass fibers and high strength glass fibers. Further, filament diameter of glass fibers is not particularly limited, but glass fibers having a filament diameter of 5 to 13 μm are generally used. Further, aramide fibers having 500 to 5,000 denier are generally used. Examples of the form of those fibers include staple, filament, cord, rope and cloth.

Examples of the rubber latex for forming the first coating layer, used in the present invention preferably include butadiene-styrene copolymer latex, dicarboxylated butadiene-styrene copolymer latex, vinyl pyridine-butadiene-styrene terpolymer latex, chloroprene latex, butadiene rubber latex, chlorosulfonated polyethylene latex, acrylonitrile-butadiene copolymer latex and nitrile group-containing highly saturated copolymer latex.

The rubber compound contained in the treating material for forming a second coating layer can be used in the form of a single rubber or as a rubber mixture of two or more of rubbers, depending on the kind of matrix rubber. Kind of rubber and solvent therefor are not particularly limited. Examples of the rubber generally used include chloroprene rubber, chlorosulfonated polyethylene, H-NBR, and H-NBR/ZDMA. Those rubbers are selected considering, for example, its compatibility with a rubber matrix, depending on the kind of rubber matrix. In particular, where the rubber matrix is a mixed rubber of H-NBR and H-NBR/ZDMA, such a mixed rubber is preferably used as the rubber compound for the second coating layer.

Weight ratio of H-NBR and H-NBR/ZDMA to be dissolved is preferably H-NBR/(H-NBR/ZDMA)=45–80/55–20. If the proportion of H-NBR/ZDMA is small, sufficient adhesive strength cannot be obtained. On the other hand, if the proportion thereof is large, a cord obtained becomes hard, and flexural fatigue deteriorates.

It is necessary for H-NBR to have an iodine value of 120 or less from the standpoints of film strength of rubber and adhesive property with matrix rubber. The iodine value is preferably 0 to 100. ZETPOL (trade name, a product of Nippon Zeon Co.) is preferably used as such a rubber. The iodine value used in the present invention is a value determined according to JIS K0070.

ZSC (trade name, a product of Nippon Zeon Co.) obtained by dispersing zinc polymethacrylate in the above ZETPOL is preferably used as H-NBR/ZDMA intended in the present invention.

Examples of a solvent used for dissolving rubbers include aromatic hydrocarbons such as toluene or xylene; halogenated hydrocarbons such as trichloroethylene; methyl ethyl ketone (hereinafter referred to as "MEK"); and ethyl acetate. Where a blend rubber such as the above-described H-NBR is used, MEK is generally used as a solvent.

Examples of the vulcanizing agent contained in the treating material for forming the second coating layer include sulfur; organic peroxides such as dicumyl peroxide or 1,3-bis(t-butyl peroxyisopropyle) benzene; and aromatic nitroso compounds such as p-dinitrosonaphthalene or p-dinitrosobenzene. In many cases, many of those compounds are previously compounded in the rubber blend. Therefore, those compounds are added if particularly required.

The silane coupling agent used in the treating material for forming the second coating layer is not particularly limited in its kind. Examples of the silane coupling agent which can be used include vinyltris(β-methoxyethoxy)silane, vinyltrichlorosilane, vinyltrimethoxysilane, vinyltriethoxysilene, γ-glycidoxypropyltrimethoxysilane, γ-glycidoxypropyltriethoxysilane, γ-methacryloxypropyltrimethoxysilane, γ-methacyloxypropyltriethoxysilane, N-β-(aminoethyl)-γ-aminopropyltrimethoxysilane, N-β-(aminoethyl)-γ-aminopropyltriethoxysilane, γ-aminopropyltrimethoxysilane, γ-aminopropyltriethoxysilane, N-phenyl-γ-aminopropyltrimethoxysilane and γ-mercaptopropyltrimethoxysilane. Of those, vinyltris(β-methoxyethoxy) silane is preferably used for the improvement of adhesive property.

The maleimide type vulcanization assistant used for forming the second coating layer is not particularly limited. Examples of the maleimide type vulcanization assistant include maleimide, phenyl maleimide and N,N-m-phenylene dimaleimide. Of those, N,N-m-phenylene dimaleimide is preferably used for the improvement of adhesive property.

The dimethacrylate type vulcanization assistant used for forming the second coating layer is not particularly limited. Examples of the dimethacrylate type vulcanization assistant include ethylene glycol dimethacrylate, diethylene glycol dimethacrylate, triethylene glycol dimethacrylate, polyethylene glycol dimethacrylate, 1,3-butylene glycol dimethacrylate, 1,6-hexane diol dimethacrylate, neopentyl glycol dimethacrylate, polypropylene glycol dimethacrylate, 2-hydroxy-1,3-dimethacryloxypropane, 2,2-bis(4-(methacryloxy•diethoxy)phenyl)propane and 2,2-bis(4-(methacryloxy•polyethoxy)phenyl)propane. Of those, 1,3-butylene glycol dimethacrylate, 2-hydroxy-1,3-dimethacryloxypropane and 2,2-bis(4-(methacryloxy•diethoxy)phenyl)propane are preferably used for the improvement of adhesive property. Of those, 1,3-butylene glycol dimethacrylate and 2,2-bis(4-(methacryloxy•diethoxy)phenyl)propane are preferably used for the improvement of adhesive property.

The treating material for forming the second coating layer comprises:

100 parts by weight of the rubber compound, 0.1 to 10 parts by weight, and preferably 0.1 to 6 parts by weight, of the vulcanizing agent, and 1 to 150 parts by weight, and preferably 30 to 80 parts by weight, of one member selected from the group consisting of silane coupling agent, maleimide type vulcanization assistant and dimethacrylate type vulcanization assistant.

If required and necessary, the treating material for forming the second coating layer of the present invention may further contain inorganic fillers (such as carbon black), plasticizers, antioxidants and crosslinking assistants.

The treating material for forming the second coating layer of the present invention is prepared in the form of 3 to 25 wt %, and preferably 5 to 15 wt %, solution or dispersion in terms of solid content.

A method for forming the second coating layer is not particularly limited. In general, a rubber-reinforcing fiber having a first coating layer formed thereon is dipped in a solvent tank filled with the treating material for forming the second coating layer, taken out of the tank, and then passed through a drying furnace, thereby forming a second coating layer. Drying conditions are not limited, but drying is generally conducted at 80 to 160° C. for 0.1 to 1 minute. The pick up weight of the treating material is 1 to 10%, and preferably 3 to 7%.

The present invention is described in more detail by reference to the following Examples, but it should be understood that the invention is not construed as being limited thereto.

EXAMPLE 1

Three glass fibers (E-glass; a bundle of 200 glass filaments each having a diameter of 9 μm) were arranged and coated with a treating material for forming a first coating layer, having compositions as shown in Table 1 below in the conventional method.

TABLE 1

| Composition | Amount (parts by weight) |
| --- | --- |
| Vinyl pyridine latex (solid content: 40 wt %) | 45 |
| Chlorosulfonated polyethylene latex (solid content: 40 wt %) | 20 |
| Resorcin/formalin condensate (solid content: 8 wt %) (resorcin/forlmalin = 1/1.3 molar ratio) | 30 |
| 25% Aqueous ammonia | 1 |
| Water | 4 |

Three glass fibers each having the first coating layer formed thereon were subjected to primary twisting of 8 twists/10 cm. Eleven of such a twisted fiber were arranged, and subjected to secondary twisting of 8 twists/10 cm. The resulting twisted bundle was coated with a treating material for forming a second coating layer, having the compositions as shown in Table 2 below, in the conventional manner, and the coating was dried and cured to obtain a glass fiber cord.

TABLE 2

| Composition | Amount (parts by weight) |
| --- | --- |
| Rubber composition | 100 |
| Toluene | 416 |
| Methyl ethyl ketone | 180 |
| Vinyl tris(β-methoxyethoxy)silane | 50 |

The amount of the second coating layer was 5% by weight based on the weight of the glass fiber cord.

Composition of the above rubber composition are shown in table 3 below.

TABLE 3

| Rubber Composition | Amount (parts by weight) |
| --- | --- |
| ZETPOL 2020(*1) | 70 |
| ZSC 2000L(*2) | 30 |
| ZnO | 10 |
| Stearic acid | 1 |
| Carbon black | 30 |
| TOTM (Trioctyl trimellitate) | 5 |
| Sulfur | 0.1 |
| 1,3-Bis-(t-butylperoxy-isopropyl)-benzene | 6 |

(*1)Trade name of H-NBR: a product of Nippon Zeon Co., Ltd.
(*2)Trade name of H-NBR/ZDMA: a product of Nippon Zeon Co., Ltd.

In order to test adhesive property between the mixed rubber of H-NBR and H-NBR/ZMDA and the above cord for reinforcing a rubber, the cord was arranged on a test piece (25 mm width, 50 mm length, 5 mm thickness) having the compositions as shown in Table 3 above along the long sides of the test piece, and the assembly was heated at 160° C. for 30 minutes to adhere the cord to the test piece.

The test piece after heat adhesion was placed on a tensile tester, and pulled in the fiber direction to measure its strength. The results obtained are shown in Table 5 below.

EXAMPLE 2

An aramide fiber (TECHNORA T202; 1,500 denier, a product of Teijin Co.) was coated with the same treating material for forming a first coating layer as used in example 1, and was heated at 250° C. for 1 minute. The pick up weight of the treating material was adjusted to 12% in terms of the solid content. Two aramide fibers thus treated were combined, and were primary twisted to 3.1 turns per inch to obtain an aramide fiber cord. The aramide fiber cord thus obtained was further treated using the same treating material for forming a second coating layer as used in Example 1. The amount of the second coating layer was 10% by weight based on the weight of the aramide fiber cord. The adhesive property was evaluated in the same manner as in Example 1.

COMPARATIVE EXAMPLE 1

Example 1 was followed except that a treating material having compositions as shown in Table 4 below was used in place of the treating material for forming a second coating layer used in Example 1. Further, the evaluation was conducted under the same conditions as in Example 1.

TABLE 4

| Compositions of treating agent or forming a second coating layer | Amount (parts by weight) |
| --- | --- |
| Rubber composition | 100 |
| Toluene | 416 |
| Methyl ethyl ketone | 180 |

COMPARATIVE EXAMPLE 2

Example 2 was followed except that the same treating material having composition as shown in Table 4 used in Comparative Example 1 was used in place of the treating material for forming a second coating layer used in Example 1 to form a second coating layer. Further, the evaluation was conducted under the same condition as in Example 2.

The results obtained in Example 1 and 2 and Comparative Example 1 and 2 are shown in Table 5 below.

TABLE 5

|  | Example | Example 2 | Comparative Example 1 | Comparative Example 2 |
| --- | --- | --- | --- | --- |
| Kind of fiber | Glass fiber | Aramide fiber | Glass fiber | Glass fiber |
| Adhesive strength (kg/25 mm) | 28 | 20 | 8 | 4 |
| State of failure | Rubber failure | Rubber failure | Interfacial separation | Interfacial separation |

EXAMPLE 3

Three glass fibers (E-glass; a bundle of 200 glass filaments each having a diameter of 9 μm) were arranged and coated with a treating material for forming a first coating layer, having compositions as shown in Table 6 below in the conventional method.

TABLE 6

| Composition | Amount (parts by weight) |
| --- | --- |
| Vinyl pyridine latex (solid content: 40 wt %) | 45 |
| Chlorosulfonated polyethylene | 20 |

TABLE 6-continued

| Composition | Amount (parts by weight) |
| --- | --- |
| latex (solid content: 40 wt %) | |
| Resorcin/formalin condensate | 30 |
| (solid content: 8 wt %) | |
| (resorcin/forlmalin = 1/1.3 molar ratio) | |
| 25% Aqueous ammonia | 1 |
| Water | 4 |

Three glass fibers each having the first coating layer formed thereon were subjected to primary twisting of 8 twists/10 cm. Eleven of such a twisted fiber were arranged, and subjected to secondary twisting of 8 twists/10 cm. The resulting twisted bundle was coated with a treating material for forming a second coating layer, having the compositions as shown in Table 7 below, in the conventional manner, and the coating was dried and cured to obtain a glass fiber cord.

TABLE 7

| Composition | Amount (parts by weight) |
| --- | --- |
| Rubber composition | 100 |
| Toluene | 416 |
| Methyl ethyl ketone | 180 |
| N,N-m-phenylene dimaleimide | 50 |

The amount of the second coating layer was 5% by weight based on the weight of the glass fiber cord.

Compositions of the above rubber composition are shown in Table 8 below.

TABLE 8

| Rubber Composition | Amount (parts by weight) |
| --- | --- |
| ZETPOL 2020(*1) | 70 |
| ZSC 2000L(*2) | 30 |
| ZnO | 10 |
| Stearic acid | 1 |
| Carbon black | 30 |
| TOTM (Trioctyl trimellitate) | 5 |
| Sulfur | 0.1 |
| 1,3-Bis-(t-butylperoxy-isopropyl)-benzene | 6 |

(*1)Trade name of H-NBR: a product of Nippon Zeon Co., Ltd.
(*2)Trade name of H-NBR/ZDMA: a product of Nippon Zeon Co., Ltd.

In order to test adhesive property between the mixed rubber of H-NBR and H-NBR/ZMDA and the above cord for reinforcing a rubber, the cord was arranged on a test piece (25 mm width, 50 mm length, 5 mm thickness) having the compositions as shown in Table 8 above along the long sides of the test piece, and the assembly was heated at 160° C. for 30 minutes to adhere the cord to the test piece.

The test piece after heat adhesion was placed on a tensile tester, and pulled in the fiber direction to measure its strength. The results obtained are shown in Table 10 below.

EXAMPLE 4

An aramide fiber (TECHNORA T202; 1,500 denier, a product of Teijin Co.) was coated with the same treating material for forming a first coating layer as used in Example 3, and was heated at 250° C. for 1 minute. The pick up weight of the treating material was adjusted to 12% in terms of the solid content. Two aramide fibers thus treated were combined, and were primary twisted to 3.1 turns per inch to obtain an aramide fiber cord. The aramide fiber cord thus obtained was further treated using the same treating material for forming a second coating layer as used in Example 3. The amount of the second coating layer was 10% by weight based on the weight of the aramide fiber cord. The adhesive property was evaluated in the same manner as in Example 3.

The results obtained are shown in Table 10 below.

COMPARATIVE EXAMPLE 3

Example 3 was followed except that a treating material having compositions as shown in Table 9 below was used in place of the treating material for forming a second coating layer used in Example 3. Further, the evaluation was conducted under the same conditions as in Example 3.

TABLE 9

| Compositions of treating agent or forming a second coating layer | Amount (parts by weight) |
| --- | --- |
| Rubber composition | 100 |
| Toluene | 416 |
| Methyl ethyl ketone | 180 |

COMPARATIVE EXAMPLE 4

Example 4 was followed except that the same treating material having compositions as shown in Table 9 used in Comparative Example 3 was used in place of the treating material for forming a second coating layer used in Example 4 to form a second coating layer. Further, the evaluation was conducted under the same conditions as in Example 4.

The results obtained in Examples 3 and 4 and Comparative Examples 3 and 4 are shown in Table 10 below.

TABLE 10

| | Example 3 | Example 4 | Comparative Example 3 | Comparative Example 4 |
| --- | --- | --- | --- | --- |
| Kind fiber | Glass fiber | Aramide fiber | Glass fiber | Glass fiber |
| Adhesive strength (kg/25 mm) | 32 | 21 | 7 | 5 |
| State of failure | Rubber failure | Rubber failure | Interfacial separation | Interfacial separation |

EXAMPLE 5

Three glass fibers (E-glass; a bundle of 200 glass filaments each having a diameter of 9 μm) were arranged and coated with a treating material for forming a first coating layer, having compositions as shown in Table 11 below in the conventional method.

TABLE 11

| Composition | Amount (parts by weight) |
| --- | --- |
| Vinyl pyridine latex | 45 |
| (solid content: 40 wt %) | |
| Chlorosulfonated polyethylene | 20 |
| latex (solid content: 40 wt %) | |
| Resorcin/formalin condensate | 30 |
| (solid content: 8 wt %) | |
| (resorcin/forlmalin = 1/1.3 molar ratio) | |
| 25% Aqueous ammonia | 1 |
| Water | 4 |

Three glass fibers each having the first coating layer formed thereon were subjected to primary twisting of 8 twists/10 cm. Eleven of such a twisted fiber were arranged, and subjected to secondary twisting of 8 twists/10 cm. The resulting twisted bundle was coated with a treating material for forming a second coating layer, having the compositions as shown in Table 12 below, in the conventional manner, and the coating was dried and cured to obtain a glass fiber cord.

TABLE 12

| Composition | Amount (parts by weight) |
|---|---|
| Rubber composition | 100 |
| Toluene | 416 |
| Methyl ethyl ketone | 180 |
| 1,3-Butyrene glycol dimethacrylate | 50 |

The amount of the second coating layer was 5% by weight based on the weight of the glass fiber cord.

Compositions of the above rubber composition are shown in Table 13 below.

TABLE 13

| Rubber Composition | Amount (parts by weight) |
|---|---|
| ZETPOL 2020(*1) | 70 |
| ZSC 2000L(*2) | 30 |
| ZnO | 10 |
| Stearic acid | 1 |
| Carbon black | 30 |
| TOTM (Trioctyl trimellitate) | 5 |
| Sulfur | 0.1 |
| 1,3-Bis-(t-butylperoxy-isopropyl)-benzene | 6 |

(*1)Trade name of H-NBR: a product of Nippon Zeon Co., Ltd.
(*2)Trade name of H-NBR/ZMDA: a product of Nippon Zeon Co., Ltd.

In order to test adhesive property between the mixed rubber of H-NBR and H-NBR/ZMDA and the above cord for reinforcing a rubber, the cord was arranged on a test piece (25 mm width, 50 mm length, 5 mm thickness) having the compositions as shown in Table 13 above along the long sides of the test piece, and the assembly was heated at 160° C. for 30 minutes to adhere the cord to the test piece.

The test piece after heat adhesion was placed on a tensile tester, and pulled in the fiber direction to measure its strength. The results obtained are shown in Table 15 below.

EXAMPLE 6

Example 5 was followed except that 2-hydroxy-1,3-dimethacryloxypropane was used in place of 1,3-butylene glycol dimethacrylate in the treating material for forming a second coating layer. The results obtained are shown in Table 15 below.

EXAMPLE 7

Example 5 was followed except that 2,2-bis(4-(methacryloxy•diethoxy)phenyl)propane was used in place of 1,3-butylene glycol dimethacrylate in the treating material for forming a second coating layer. The results obtained are shown in Table 15 below.

EXAMPLE 8

An aramide fiber (TECHNORA T202; 1,500 denier, a product of Teijin Co.) was coated with the same treating material for forming a first coating layer as used in Example 5, and was heated at 250° C. for 1 minute. The pick up weight of the treating material was adjusted to 12% in terms of the solid content. Two aramide fibers thus treated were combined, and were primary twisted to 3.1 turns per inch to obtain an aramide fiber cord. The aramide fiber cord thus obtained was further treated using the same treating material for forming a second coating layer as used in Example 5. The amount of the second coating layer was 10% by weight based on the weight of the aramide fiber cord. The adhesive property was evaluated in the same manner as in Example 5. The results obtained are shown in Table 15 below.

COMPARATIVE EXAMPLE 5

Example 5 was followed except that a treating material having compositions as shown in Table 14 below was used in place of the treating material for forming a second coating layer used in Example 5. Further, the evaluation was conducted under the same conditions as in Example 5.

TABLE 14

| Composition of treating agent for forming a second coating layer | Amount (parts by weight) |
|---|---|
| Rubber composition | 100 |
| Toluene | 416 |
| Methyl ethyl ketone | 180 |

COMPARATIVE EXAMPLE 6

Example 8 was followed except that the same treating material having compositions as shown in Table 14 used in Comparative Example 5 was used in place of the treating material for forming a second coating layer used in Example 8 to form a second coating layer. Further, the evaluation was conducted under the same conditions as in Example 8.

The results obtained in Examples 5 to 8 and Comparative Examples 5 and 6 are shown in Table 15 below.

TABLE 15

|  | Example 5 | Example 6 | Example 7 | Example 8 | Comparative Example 5 | Comparative Example 6 |
|---|---|---|---|---|---|---|
| Kind of fiber | Glass fiber | Glass fiber | Glass fiber | Aramide fiber | Glass fiber | Aramide fiber |
| Adhesive strength (kg/25 mm) | 30 | 30 | 31 | 20 | 8 | 4 |
| State of failure | Rubber failure | Rubber failure | Rubber failure | Rubber failure | Interfacial separation | Interfacial separation |

As described above, the present invention provides a glass fiber cord having markedly improved adhesive property to a rubber blend comprising a hydrogenated acrylonitrile-butadiene rubber having excellent flex resistance and heat resistance and a hydrogenated acrylonitrile-butadiene rubber having dispersed therein zinc methacrylate. By using such a glass fiber cord as a reinforcing material, it becomes possible to obtain hydrogenated acrylonitrile-butadiene rubber-based rubber products which can be used under high temperature environment and have a greatly improved durability.

While the invention has been described in detail and with reference to specific embodiments thereof, it will be apparent to one skilled in the art that various changes and modifications can be made therein without departing from the spirit and scope thereof.

What is claimed is:

1. A cord for reinforcing a rubber, which comprises:
   a fiber for reinforcing a rubber,
   a first coating layer formed on the surface of the fiber by coating a treating material comprising a rescorcin/formalin condensate and a rubber latex on the surface thereof, and drying and curing the resulting coating, and
   a second coating layer formed on the surface of the first coating layer by coating another treating material on the surface thereof, and drying and curing the resulting coating, wherein the another treating material for forming the second coating layer comprises a mixed rubber of a hydrogenated acrylonitrile-butadiene rubber and a hydrogenated acrylonitrile-butadiene rubber having dispersed therein zinc methacrylate, a vulcanizing agent and one member selected from the group consisting of a silane coupling agent, a maleimide vulcanization assistant and a dimethacrylate vulcanization assistant.

2. The cord as claimed in claim 1, wherein said vulcanizing agent is selected from the group consisting of sulfur, organic peroxides and aromatic nitroso compounds.

3. The cord as claimed in claim 1, wherein said silane coupling agent is selected from the group consisting of vinyltris($\beta$-methoxyethoxy)silane, vinyltrichlorosilane, vinyltrimethoxysilane, vinyltriethoxysilene, $\gamma$-glycidoxypropyltrimethoxysilane, $\gamma$-glycidoxypropyltriethoxysilane, $\gamma$-methacryloxypropyltrimethoxysilane, $\gamma$-methacyloxypropyltriethoxysilane, N-$\beta$-(aminoethyl)-$\gamma$-aminopropyltrimethoxysilane, N-$\beta$-(aminoethyl)-$\gamma$-aminopropyltriethoxysilane, $\gamma$-aminopropyltrimethoxysilane, $\gamma$-aminopropyltriethoxysilane, N-phenyl-$\gamma$-aminopropyltrimethoxysilane and $\gamma$-mercaptopropyltrimethoxysilane.

4. The cord as claimed in claim 1, wherein said silane coupling agent is vinyltris($\beta$-methoxyethoxy)silane.

5. The cord as claimed in claim 1, wherein said maleimide vulcanization assistant is selected from the group consisting of maleimide, phenyl maleimide and N,N-m-phenylene dimaleimide.

6. The cord as claimed in claim 1, wherein said maleimide vulcanization assistant is N,N-m-phenylene dimaleimide.

7. The cord as claimed in claim 1, wherein said dimethacrylate vulcanization assistant is selected from the group consisting of ethylene glycol dimethacrylate, diethylene glycol dimethacrylate, triethylene glycol dimethacrylate, polyethylene glycol dimethacrylate, 1,3-butylene glycol dimethacrylate, 1,6-hexane diol dimethacrylate, neopentyl glycol dimethacrylate, polypropylene glycol dimethacrylate, 2-hydroxy-1,3-dimethacryloxypropane, 2,2-bis(4-(methacryloxy•diethoxy)phenyl)propane and 2,2-bis(4-(methacryloxy•polyethoxy)phenyl) propane.

8. The cord as claimed in claim 1, wherein the dimethacrylate vulcanization assistant is 1,3-butylene glycol dimethacrylate.

9. The cord as claimed in claim 1 wherein said dimethacrylate vulcanization assistant is 2-hydroxy-1,3-dimethacryloxypropane.

10. The cord as claimed in claim 1, wherein said dimethacrylate vulcanization assistant is 2,2-bis(4-(methacryloxy•diethoxy)phenyl)propane.

* * * * *